United States Patent Office 3,021,426
Patented Feb. 13, 1962

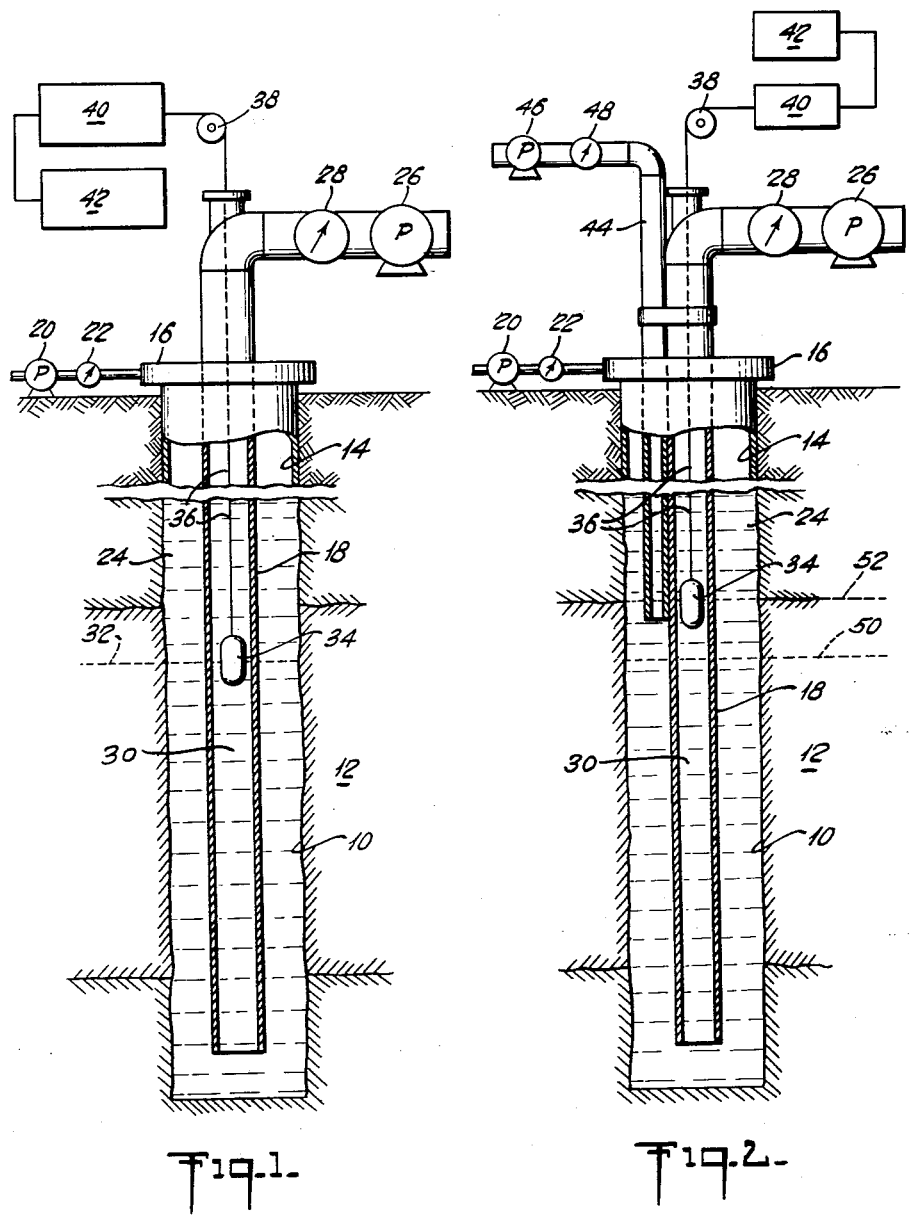

3,021,426
SUBSURFACE SURVEYING
George M. Wood, Houston, Tex., assignor to Texaco Inc., a corporation of Delaware
Filed Sept. 4, 1958, Ser. No. 758,989
14 Claims. (Cl. 250—43.5)

This invention relates to a method of studying subsurface earth formations and more particularly to a method of determining the permeability of earth formations traversed by a well or borehole.

Knowledge of the permeability of subsurface formations in petroleum operations is of considerable importance. In secondary recovery operations for the production of oil from subsurface formations a fluid, for example, water, oil or gas, is pumped into an injection well located at a point remote from an oil production well and directed into a given formation or vertical interval in the injection well to urge oil which may be contained therein toward the production well. In order to determine whether the fluid pumped into the injection well is being efficiently injected into the given formation the amount of fluid passing into various vertical increments of the wall of the injection well must be known. A log which indicates the vertical increments of the injection well into which fluid is entering and the amount of fluid flowing into each increment is sometimes referred to as an injectivity profile or permeability log of the well.

A method of obtaining an injectivity profile or permeability log of a well or a particular formation traversed by a borehole has been described in U.S. Patent 2,700,734, granted to Edmond F. Egan and Gerhard Herzog on January 25, 1955. In the patented method two streams of fluid are pumped into a well, one stream passing through a string of tubing extending downwardly to a point below the formation of interest and the other stream passing downwardly through the annular space betwen the tubing and the casing or the wall of the well. The streams are pumped simultaneously and each stream is carefully metered at the surface. The fluid pumped down through the tubing will, after filling the exposed portion of the well below the tubing, flow upwardly around the tubing until it meets the fluid pumped downwardly through the annular space, thus forming an interface between the two streams or bodies of fluid. In order to locate the interface between the two streams a small amount of tracer material, such as a radioactive substance, is added to one of the streams before it enters the well so that all of the fluid in this stream will be radioactive while the other stream will be non-radioactive. The depth in the well at which the interface lies may be readily located by lowering a detector, e.g., a radioactivity detector, into the well and simultaneously and continuously recording the depth of the detector and the output signal therefrom. The response of the detector will change abruptly when the detector passes from the radioactive fluid into the non-radioactive fluid or vice versa.

In order to determine the amount of fluid that is entering into a vertical increment of the formation of interest the rates of injection or pumping of each of the two streams are varied but the sum of the rates are maintained constant. By changing the ratio of the amount of the radioactive fluid to the amount of non-radioactive fluid injected, the interface will move to another depth in the well. The difference in the amount of either of the fluids injected into the well is the amount of fluid that is entering into the vertical increment of the formation between the two interfaces. It can be seen that by making appropriate changes in the ratio of the amount of radioactive fluid to the amount of non-radioactive fluid pumped into the well the interface can be moved in a number of steps through the well past the formation of interest to provide an accurate log of the permeability of the formation, the length of each of the vertical increments between successive interfaces depending upon the amount of change of the rates of the two streams and upon the permeability of the increment. After each adjustment or change in the rates of the two streams the radiation detector is passed through the well and a record is made of the rates of the two streams and the depth of the interface. Accordingly, it can be seen that in this manner an injectivity profile is made of a formation which clearly shows the permeability of the various vertical increments of the formation.

The streams introduced into the borehole may be any fluid streams, for example, gas, water or oil streams. Heretofore, the tracer materials used in one of the two fluid streams introduced into the borehole were radioactive tracers. In the event that the initial injectivity log of the borehole was found to be unintelligible in whole or in part and a repeat survey of the borehole was to be run, an attempt was made to flush the isotope or radioactive tracer initially used from the vicinity of the borehole with the non-radioactive stream. However, in many cases it was found that the area in the vicinity of the borehole could not be freed readily from these radioactive materials and their associated radiation emanations. Thus, these radiations produced a high radioactive background in the borehole which interfered with radiation tests made soon after the original survey. Accordingly, the running of a subsequent survey had to be delayed for at least several days until sufficient decay of the radioactive material had occurred so that the radiations from same were insignificant.

Accordingly, this invention provides an improved method of surveying a borehole by incorporating in a stream flowing into a subsurface formation a radioactive tracer material having a given gamma ray energy level when producing a first log of the borehole and then incorporating in a stream flowing into the subsurface formation a radioactive tracer material having a gamma ray energy level distinctly different from the given energy level of the first radioactive tracer material.

For a better understanding of the invention reference may be had to the accompanying drawing in which:

FIG. 1 is a vertical sectional elevation through a well showing apparatus used to make an injectivity profile employing two streams forming a single fluid interface, and FIG. 2 is a vertical sectional elevation through a well showing the apparatus used to make an injection profile employing three streams forming two interfaces.

Referring to FIG. 1 of the drawing, the well or borehole 10 is shown as traversing several subsurface formations including a permeable formation 12 for which it is desired to make an injectivity profile. The upper portion of the well is shown as being provided with a casing 14 having a closed casing head 16. A string of tubing 18 passes through the casing head and downwardly through the well to a point below the formation 12. At the surface a pump 20 is connected to the casing head through a meter 22 and is adapted to pump a stream of fluid 24 downwardly into the well through the annular space between the casing 14 and the tubing 18. A second pump 26 is connected through a meter 28 to the upper end of the tubing 18 to introduce a second stream 30 into the borehole 10. In order to locate in the well the interface between these two streams, one of these two streams is tagged. In accordance with the present invention, the tagging material is an isotope emitting gamma rays of relatively low energy level. Such an isotope may, for example, be iodine 131 which emits gamma rays having energies not higher than 0.7 mev.

The isotopes used are preferably those which may be conveniently transported to the well site and should be shipped in such a concentration so as to have the desired radioactivity on the date that a survey or log is to be made. The tracer solution to be injected into the stream is prepared in a preferably lid covered mixing tank by adding the tracer solution to a predetermined amount of fluid-miscible solvent to produce the desired amount of injection solution of desired strength.

The tracer mixing tank may be connected to a positive displacement pump having an output that is variable from 0 to 1.2 gallons per hour and having a calibrated mechanism for controlling the length of the stroke. In addition to utilizing the calibrated setting of the pump, the injection fluid may be piped through visual flow indicators and then introduced into the desired stream.

To tag the stream flowing down the annulus, a small amount of low energy level isotope is added to the stream 24 by means, not shown, preferably after the stream has discharged from pump 26. Accordingly, pump 26 is used to pump non-radioactive fluid 30 downwardly through the tubing 18. The non-radioactive fluid 30 passes out the bottom end of the tubing 18 and upwardly around the tubing until it meets the radioactive fluid 24 at the interface 32. It may be seen that as the pumps 20 and 26 are adjusted to change their rates of pumping while the total amount of oil pumped by both pumps remains constant, the interface 32 will then be caused to move up or down in the hole depending on the two pumping rates.

It should be understood that instead of using one pump to pump the tubing stream and another pump to pump the annulus stream, the apparatus may include a single pump to pump the total stream and a two-way valve to divide the total stream into the tubing and annulus streams in the desired proportions to thus facilitate maintaining a constant total flow rate.

Shown as suspended within the tubing 18 is a radioactive logging instrument 34 containing a detector of gamma rays, the output of which is conducted upwardly through the cable 36. This cable passes over a suitable cable measuring device 38 which continuously detects the depth of the instrument 34 in the hole and then to a suitable amplifier 40 and a recorder 42. When the instrument 34 is lowered down through the tubing, it will, of course, respond to the radiation of the radioactive fluid until it passes the interface 32 when the detector output will suddenly decrease. A record of the output of the detector 34 is made continuously by the recorder 42 and this is correlated with the depth of the detector 34 in the hole as measured by the cable measuring device 38. Thus, by passing the detector 34 through the hole 10 and comparing points in the recorder at which the detector 34 passes from or into the radioactive fluid with the depth in the hole at which these points are registered, an accurate measurement is made of the depth of the interface 32.

After the interface has been located in the borehole for a given ratio the flow rates of the two fluid streams, the ratio of the flow rates of the radioactive fluid 24 and the non-radioactive fluid 30 are changed. The interface 32 between the fluids will move along the wall of the subsurface formation to a new location to an extent depending on the permeability of the formation to be located in the manner explained hereinabove. It should be noted that the ratio of the fluid rates of the two streams is changed but that the sum of the flow rates of the two streams is held constant.

Although in the above described injectivity method, the radioactive fluid has been pumped down through the annular space between the tubing 18 and the walls of the hole 10 and the non-radioactive fluid 30 through the tubing, it is to be understood that the paths of these fluids can be interchanged, that is, the radioactive fluid can be pumped down through the tubing 18 and the non-radioactive fluid can be pumped down through the annulus without affecting the process.

When it is found necessary to repeat the survey, or to obtain intermediate points, the radioactive stream is tagged in accordance with the present invention with a second isotope which emits gamma rays having an energy level which is substantially higher than the energy level of the rays used in the first or original survey. The discrimination setting or bias of the detection equipment can be set at an intermediate point above the low energy gammas of the first isotope and below the high energy gammas of the second isotope. With such discrimination the gammas of the first isotope are not detected so that their effect is eliminated and the subsequent run is made as if over natural background.

In accordance with the present invention, when a water injectivity profile log is desired the initial survey or log is made with the use of a radioactive alkyl metal iodide, such as sodium, potassium or lithium iodide, and the subsequent survey is made with the use of a water soluble radioactive inorganic metal salt and more particularly with a water soluble antimony or iron salt. The initial survey is preferably made with radioactive sodium iodide (NaI$^{131}$). The radioactive iodide 131 has an eight day half life with gamma emission having energies of .36 to .7 mev. Suitable examples of available compounds of antimony and iron salts are antimony trichloride (SbCl$_3$) utilizing radioactive antimony Sb$^{124}$ and having infinite solubility in water at 80° C.; antimony trifluoride (SbF$_3$) utilizing radioactive antimony 124 and having a solubility of 563.6 grams per 100 milliliters of water at 30° C.; ferrous acetate (Fe(C$_2$H$_3$O$_2$)$_2$·4H$_2$O) utilizing radioactive iron 59 and being very soluble in water; and ferric bromide (FeBr$_3$·6H$_2$O) utilizing radioactive iron 59 and being very soluble in water. The radioactive antimony 124 has a 60 day half life with gamma emission having energies between 1.75 to 2.11 mev. and radioactive iron 59 has a 45 to 47 day half life with gamma emission having energies of 1.1 mev. or more.

When a gas injectivity profile log is desired the initial survey or log is made with the use of a vaporizable or low boiling alkyl iodide, for example, ethyl, methyl, propyl, or butyl iodide utilizing radioactive iodine 131, preferably with the use of ethyl iodide in a carrier of ethyl alcohol and the subsequent survey is made with the use of an inorganic metal hydride, for example, radioactive antimony hydride (SbH$_3$) which occurs as a gas or which may be used in alcohol as a carrier.

When an oil injectivity profile log is desired the initial survey or log is made with the use of a radioactive iodine 131-containing material which may be elemental iodine in, for example, a benzene carrier or alkyl iodides. The subsequent survey is made with the use of oil soluble radioactive inorganic metal salts or organo-metallic compounds, for example, antimony ethoxide (Sb(C$_2$HO)$_3$) which soluble in organic liquids, triphenyl antimony (Sb(C$_6$H$_5$)$_3$) which is soluble in organic solvents, vanadium oxytrichloride (VOCl$_3$) which utilizes radioactive vanadium 48 which has a 16 day half life and an energy level of between 1.05 to 1.5 mev. and columbium pentachloride (CbCl$_5$) which utilizes radioactive columbium 92 and which has an 8.2 day half life and an energy level of about 1.0 mev.

The logging method described hereinabove somewhat in detail relates to a single fluid interface method of determining the injectivity profile of a subsurface formation traversed by a borehole wherein the above described radioactive tracer materials may be used in accordance with the present invention. However, it should be understood that the method of the present invention is not limited to the single interface method to determine subsurface formation permeabilities.

Another form of the invention contemplated within the scope of this invention is the two interface method, the apparatus of which is illustrated in FIG. 2. This apparatus is similar to the apparatus illustrated in FIG. 1 except that it further includes an adjustable thin or macaroni tubing 44 which is lowered into the borehole so that the lower opening thereof is approximately opposite the formation interval being measured. Connected to the upper end of the macaroni tubing 44 is a third pump 46 and a third meter 48. The addition of the macaroni tubing 44 provides means for introducing a third stream into the borehole 10 to form therein between three fluid bodies two interfaces 50 and 52. In this two interface system which is described in more detail in copending applications having Serial No. 463,998, now Patent No. 2,947,869, filed October 22, 1954, and having Serial No. 704,814, filed December 23, 1957, the rate of flow of the stream through the macaroni tubing 44 is maintained constant and the total rates of flow of the three streams is also held constant. The rates of flow of the stream through the tubing and of the stream down the annulus are varied as before and the lower open end of the macaroni tubing is adjusted for each run so as to be disposed opposite the increment of the formation under test. The radioactivity logger is employed in the same manner as in the single interface method except that the detector will indicate two interfaces. The location of the two interfaces is readily detected by injecting into the stream flowing through the macaroni tubing during the initial survey, a radioactive substance having gamma rays of a relatively low energy level. However, as an alternative, this radioactive substance may be injected into both the stream flowing through the tubing and the stream flowing downwardly through the annulus. An advantage of this two interface method is that a single traverse of borehole by the detector indicating the two fluid interfaces determines directly the permeability of or the rate of fluid flow into the increment of the formation between these two interfaces. If a subsequent survey is to be made in the same borehole within a few days of the first survey, a radioactive substance having gamma rays of a substantially higher level than that of the radioactive substance used in the initial survey is employed.

A further method of determining the permeability of a subsurface formation contemplated within the scope of this invention includes injecting through a borehole or well into a desired permeable subsurface formation, a fluid stream containing a first radioactive substance having gamma rays of a relatively low energy level, determining the radioactivity in the borehole in the vicinity of the desired subsurface formation, then preferably performing in the well a remedial operation, such as fracturing or plugging, injecting through the borehole into the desired formation a fluid stream containing a second radioactive substance having gamma rays of a substantially higher energy level than that of the first radioactive substance and again determining the radioactivity in the borehole in the vicinity of the desired subsurface formation.

Obviously, many modifications and variations of the invention as hereinabove set forth may be made without departing from the spirit and scope thereof and therefore only such limitations should be made as are indicated in the appended claims.

I claim:

1. A method of surveying a borehole which comprises incorporating into a stream of fluid flowing through the borehole a first radioactive substance having a given relatively low gamma ray energy level, determining the radioactivity in the borehole, then incorporating into a stream of fluid flowing through the borehole prior to any substantial decay of the energy level of said first radioactive substance a second radioactive substance having a gamma ray energy level substantially greater than that of said first radioactive substance at the time said second radioactive substance is introduced, and again determining the radioactivity of the borehole.

2. A method as set forth in claim 1 wherein said stream of fluid is a stream of water, said first radioactive substance is an alkyl metal iodide and said second radioactive substance is a water soluble inorganic metal salt.

3. A method as set forth in claim 2 wherein said inorganic metal salt is one of the group consisting of antimony and iron salts.

4. A method as set forth in claim 2 wherein said alkyl metal iodide is sodium iodide 131.

5. A method as set forth in claim 1 wherein said stream of fluid is a stream of gas, said first radioactive substance is a volatile alkyl iodide and said second radioactive substance is an inorganic metal hydride.

6. A method as set forth in claim 5 wherein said alkyl iodide is ethyl iodide.

7. A method as set forth in claim 6 wherein said metal hydride is antimony hydride.

8. A method as set forth in claim 1 wherein said stream of fluid is a stream of oil, said first radioactive substance is an iodine-containing material and said second radioactive substance is one of the group consisting of oil soluble inorganic metal salts and organo-metallic compounds.

9. A method as set forth in claim 1 wherein said stream of fluid is a stream of oil, said first radioactive substance is elemental iodine 131 and said second radioactive substance is an oil soluble organic-metallic compound.

10. A method as set forth in claim 9 wherein said organo-metallic compound is triphenyl antimony.

11. A method of surveying a borehole which comprises determining the natural radioactivity in the borehole, introducing a stream of fluid into a subsurface formation surrounding the borehole, incorporating into the stream of fluid a first radioactive substance having a gamma ray intensity substantially greater than the natural radioactivity in the borehole, again determining the radioactivity in the borehole, then incorporating into the stream of fluid prior to decay of the gamma ray intensity of said first radioactive substance, a second radioactive substance having a gamma ray energy level substantially greater than that of the first radioactive substance at the time of introduction of said second radioactive substance, and selectively determining the radioactivity produced by said second radioactive substance in the borehole.

12. A method of surveying a borehole wherein at least two streams are introduced into subsurface formations surrounding the borehole and form an interface therebetween, which comprises incorporating into at least one of the two streams a first radioactive substance having a given relatively low gamma ray energy level, determining the radioactivity in the borehole, then incorporating into at least one of the two streams prior to any substantial decay of energy level of said first radioactive substance a second radioactive substance having a gamma ray energy level substantially greater than that of the first radioactive substance at the time of introduction of said second radioactive substance, and again determining the radioactivity in the borehole.

13. A method of surveying a borehole which comprises incorporating into a stream of fluid flowing through the borehole a first radioactive substance having a gamma ray energy level less than 1 mev., determining the radioactivity in the borehole, then incorporating into a stream of fluid flowing through the borehole prior to substantial decay of the energy level of said first radioactive substance, a second radioactive substance having a gamma ray energy level at least equal to 1 mev. at the time of the introduction thereof, and selectively determining the radioactivity produced by said second substance in the borehole.

14. A method of making a permeability log of a predetermined zone of a borehole wherein a fluid stream is introduced into said zone and wherein first and second surveys are made of the predetermined zone, the improvement which comprises incorporating in said fluid stream during the first survey a first radioactive substance having gamma rays of a relatively low energy level, and incorporating in the fluid stream during the second survey prior to any substantial decay of the energy level of said first radioactive substance, a second radioactive substance having gamma rays of a substantially higher energy level than that of said first radioactive substance at the time of the introduction of the fluid stream during said second survey.

References Cited in the file of this patent
UNITED STATES PATENTS

| | | |
|---|---|---|
| 2,451,520 | Teplitz | Oct. 19, 1948 |
| 2,560,510 | Hinson | July 10, 1951 |
| 2,648,014 | Arthur | Aug. 4, 1953 |
| 2,700,734 | Egan et al. | Jan. 25, 1955 |
| 2,749,444 | Shea | June 5, 1956 |
| 2,869,642 | McKay et al. | Jan. 20, 1959 |

UNITED STATES PATENT OFFICE
CERTIFICATE OF CORRECTION

Patent No. 3,021,426 February 13, 1962

George M. Wood

It is hereby certified that error appears in the above numbered patent requiring correction and that the said Letters Patent should read as corrected below.

Column 4, line 28, column 6, lines 12 and 17, for "alkyl", each occurrence, read -- alkali --.

Signed and sealed this 19th day of June 1962.

(SEAL)
Attest:

ERNEST W. SWIDER
Attesting Officer

DAVID L. LADD
Commissioner of Patents